(12) United States Patent
Shah

(10) Patent No.: US 11,699,161 B2
(45) Date of Patent: Jul. 11, 2023

(54) AUTHENTICATION AND AUTOMATED RETURN PROCESSING NETWORK

(71) Applicant: eBay Inc., San Jose, CA (US)

(72) Inventor: Maunish Ashok Shah, San Jose, CA (US)

(73) Assignee: EBAY INC., San Jose, CA (US)

( * ) Notice: Subject to any disclaimer, the term of this patent is extended or adjusted under 35 U.S.C. 154(b) by 119 days.

(21) Appl. No.: 17/088,966

(22) Filed: Nov. 4, 2020

(65) Prior Publication Data

US 2022/0138761 A1    May 5, 2022

(51) Int. Cl.
*G06Q 30/016*    (2023.01)
*G06Q 30/018*    (2023.01)

(52) U.S. Cl.
CPC ....... *G06Q 30/016* (2013.01); *G06Q 30/0185* (2013.01)

(58) Field of Classification Search
None
See application file for complete search history.

(56) References Cited

U.S. PATENT DOCUMENTS

| | | | |
|---|---|---|---|
| 8,156,007 B1 | 4/2012 | Anthony et al. | |
| 8,666,907 B1* | 3/2014 | Wang | G06Q 30/01 705/26.1 |
| 2002/0019777 A1* | 2/2002 | Schwab | G06Q 10/0837 705/26.41 |
| 2004/0006514 A1* | 1/2004 | Rogers | G06Q 20/209 705/24 |
| 2005/0192816 A1* | 9/2005 | Wechsel | G06Q 10/087 705/28 |
| 2005/0216368 A1* | 9/2005 | Wechsel | G06Q 30/00 705/28 |
| 2006/0165260 A1* | 7/2006 | Vanjani | G06Q 30/02 705/317 |

(Continued)

OTHER PUBLICATIONS

Amir Ismael, eBay launched an authentication program that makes it safer to buy and sell big-ticket items like watches, designer handbags, and collectibles on the site—here's how it works, Sep. 17, 2020,Insider Inc.*

(Continued)

*Primary Examiner* — Peter Ludwig
*Assistant Examiner* — Donald J Edmonds
(74) *Attorney, Agent, or Firm* — Schwegman Lundberg & Woessner, P.A.

(57) ABSTRACT

Systems and methods for integrating and managing an authentication and automated return process are provided. In example embodiments, a network system receives, via a first application protocol interface (API) call from an authenticator system, an indication that an item associated with a transaction is not authentic, whereby the transaction occurred on the network system between accounts associated with a first and second client device. Based on the receiving of the indication, the network system automatically causes a return to be created at the network system. The network system then automatically triggers processing of the return including transferring funds to the account associated with the first client device, the account associated with the first client device previously providing payment to purchase the item and the account associated with the second client device providing the item for sale.

17 Claims, 8 Drawing Sheets

(56) References Cited

U.S. PATENT DOCUMENTS

| | | | | |
|---|---|---|---|---|
| 2008/0071627 A1* | 3/2008 | Junger | ............... | G06Q 30/00 |
| | | | | 705/22 |
| 2010/0235290 A1* | 9/2010 | Junger | ............... | G06Q 40/00 |
| | | | | 705/336 |
| 2011/0106714 A1* | 5/2011 | Junger | ............ | G06Q 20/209 |
| | | | | 235/375 |
| 2014/0289079 A1* | 9/2014 | Junger | ............... | G06Q 40/12 |
| | | | | 705/28 |
| 2016/0092875 A1* | 3/2016 | Howe | ............... | G06Q 20/42 |
| | | | | 705/44 |
| 2017/0243178 A1* | 8/2017 | Bedier | ........... | G06Q 20/3821 |
| 2018/0336569 A1* | 11/2018 | Ritchie | ............. | H04L 51/16 |
| 2019/0043059 A1* | 2/2019 | Xie | .................. | G06Q 20/401 |
| 2019/0340623 A1* | 11/2019 | Rivkind | ......... | G06Q 30/0185 |
| 2020/0273031 A1* | 8/2020 | Narayan | ........... | H04L 9/3239 |

OTHER PUBLICATIONS

Ismael, Amir; eBay launched an authentication programthat makes it safer to buy and sell big-ticketitems like watches, designer handbags, andcollectibles on the site—here's how itworks; Sep. 17, 2020, Insider Reviews.*

\* cited by examiner

AUTHENTICATION AND AUTOMATED RETURN PROCESSING NETWORK

TECHNICAL FIELD

The subject matter disclosed herein generally relates to machines configured to manage return processing, and to technologies by which such special-purpose machines become improved compared to other machines that manage return processing. Specifically, the present disclosure addresses systems and methods that integrate authentication of goods into an automated return process in a network environment.

BACKGROUND

Transactions conducted in a network environment are sometimes subject to fraud since the transactions occur sight unseen. For instance, goods shipped to a buyer may be counterfeit. Alternatively, a buyer may attempt to obtain a refund for an authentic item that they replaced with a counterfeit item or counterfeit parts.

BRIEF DESCRIPTION OF DRAWINGS

Various ones of the appended drawings merely illustrate example embodiments of the present invention and cannot be considered as limiting its scope.

DETAILED DESCRIPTION

Figure 1:
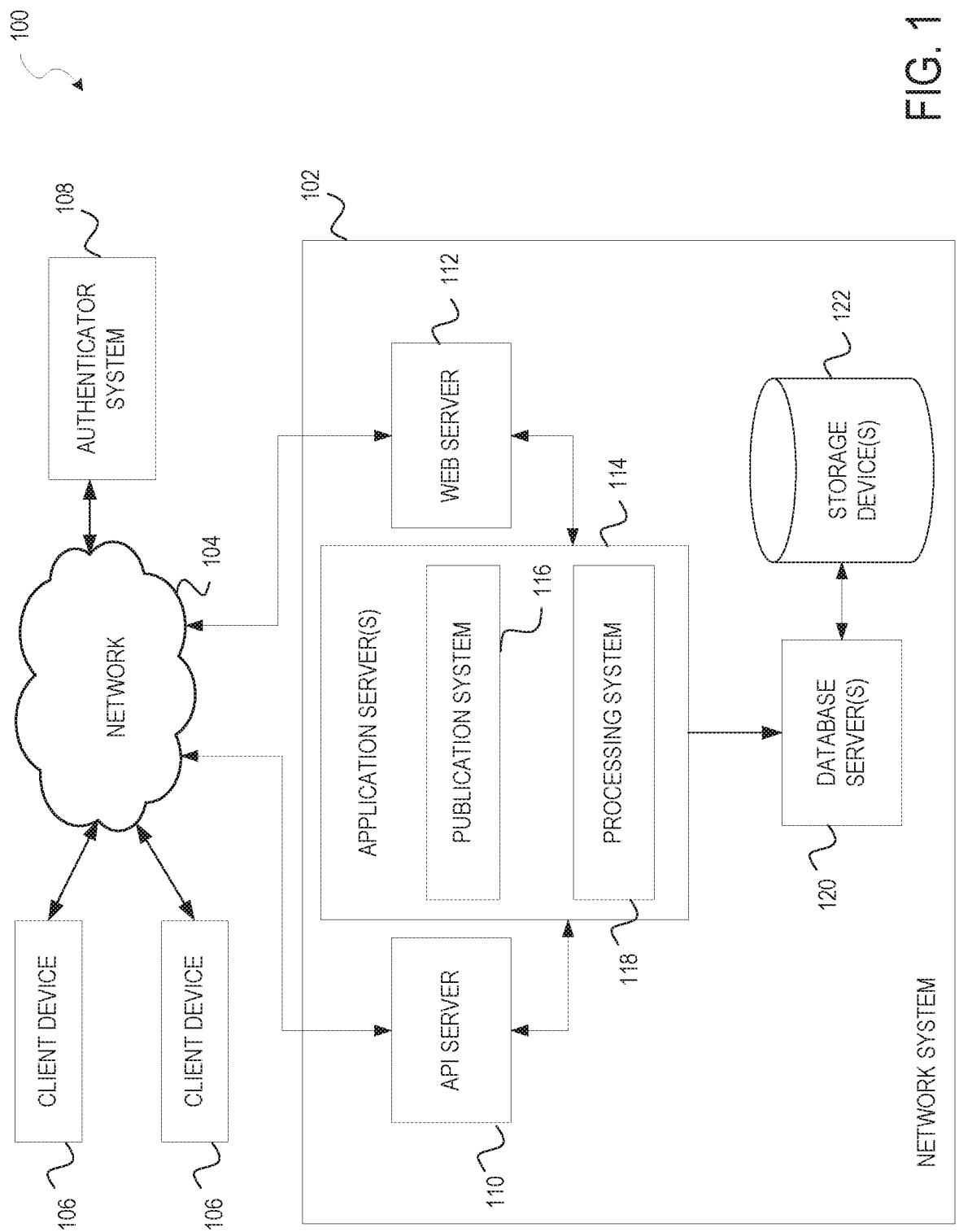
FIG. 1 is a diagram illustrating a network environment suitable for providing an authentication and return processing network, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide systems and methods that automate return processing based on authenticity of an item. Accordingly, systems and methods for integrating and managing an authentication and automated return process are provided herein. In example embodiments, a network system receives, via a first application protocol interface (API) call from an authenticator system, an indication that an item associated with a transaction is not authentic, whereby the transaction occurred on the network system between accounts associated with a first and second client device. Based on the receiving of the indication, the network system automatically causes a return to be created at the network system. The network system then monitors for a shipping event which indicates that the item has been shipped. Based on the detected shipping event, the network system, in accordance with one embodiment, automatically triggers processing of the return including transferring funds to the account associated with the first client device, whereby the account associated with the first client device previously provided payment to purchase the item and the account associated with the second client device provided the item for sale.

Accordingly, the present disclosure provides, in one embodiment, a technical solution to the technical problem of automating a refund processing. The automated refund process requires no user intervention. Instead, various detected operations or interactions are detected by components of the network system, which subsequently trigger other components of the network system to perform operations to process a return including transferring of funds between accounts. The operations are performed by a specially configured machine that includes, among other components, a return service engine, a disposition engine, a batch event system, and a funds processor. In various embodiments, data received by the network system and transmitted between some of the components of the network system are via application protocol interface (API) calls.

With reference to FIG. 1, an example embodiment of a network environment suitable for providing an authentication and return processing network is shown. A network system 102 provides server-side functionality via a communication network 104 (e.g., the Internet, wireless network, cellular network, or a Wide Area Network (WAN)) to client devices 106 and an authenticator system 108. In example embodiments, the client device 106 is a device of a user that is involved in a transaction conducted through an account of the user associated with the client device 106 with the network system 102 via the network 104. For example, the client device 106 may be associated with a buyer, a seller, a store, or other entity that is involved in transactions at the network system 102.

The authenticator system 108 may be a device associated with an entity that authenticates items (referred to as an "authenticator"). In example embodiments, the authenticator and authenticator system 108 functions as an intermediary between users (and their respective accounts associated with their client devices 106) involved in a transaction by authenticating an item post-transaction (e.g., after the transaction has been agreed to between the accounts). The result of the authentication is used to automate a refund processor at the network system 102. Accordingly, the authenticator receives the item and determines its authenticity. An indication of the authenticity is then provided, via the authentication system 108 to the network system 102 (e.g., as an API call), which then triggers automated operations to occur at the network system 102, as will be discussed in more detail below. The authentication process can occur prior to receipt of the item by the buyer or as part of a return process after the buyer has received the item and initiates a return.

The client device 106 and the authenticator system 108 interface with the network system 102 via a connection with the network 104. Depending on the form of the client device 106 and the authenticator system 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth or fifth generation wireless, 4G or 5G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

The client device 106 and/or the authenticator system 108 may comprise, but is not limited to, a smartphone, tablet, laptop, multi-processor systems, microprocessor-based or programmable consumer electronics, game consoles, set-top boxes, a server, or any other communication device that a user or authenticator may utilize to access the network system 102. In some embodiments, the client device 106 and/or the authenticator system 108 comprise a display module (not shown) to display information (e.g., in the form of the user interfaces). In further embodiments, the client device 106 and/or the authenticator system 108 comprise one or more of a touch screen, accelerometer, camera, microphone, and Global Positioning System (GPS) device.

The client device 106 and/or the authenticator system 108 may include one or more applications (also referred to as "apps") such as, but not limited to, a web browser, messaging application, electronic mail (email) application, a network system application (associated with the network system 102), third-party applications, and the like. In some embodiments, if a site application (e.g., the network system application) is included in the client device 106 or the authenticator system 108, then this application is configured to locally provide the user interface and at least some of the functionalities with the application configured to communicate with the network system 102, on an as needed basis, for data or processing capabilities not locally available (e.g., to publish publications, access a database of published publications, to authenticate a user, to provide communications with other users of the network system 102). Conversely if the site application is not included in the client device 106 or the authenticator system 108, the client device 106 or the authenticator system 108 may use its web browser to access a website (or a variant thereof) hosted on the network system 102.

In various embodiments, the data exchanged within the network environment 100 may be dependent upon user-selected functions available through one or more client or user interfaces (UIs). In some cases, the UIs may be presented as part of a user experience (UX) displayed the web browser. The UIs may also be associated with one or more applications (e.g., the site application provided by or through the network system 102).

Turning specifically to the network system 102, an application program interface (API) server 110 and a web server 112 are coupled to, and provide programmatic and web interfaces respectively to, one or more application servers 114. The application servers 114 host a publication system 116 and a processing system 118, each of which may comprise one or more modules, applications, or engines, and which can be embodied as hardware, software, firmware, or any combination thereof. The application servers 114 are, in turn, coupled to one or more database servers 120 that facilitate access to one or more information storage repositories or data storage device(s) 122. In one embodiment, the data storage device 122 is a device that stores content (e.g., publications or listings, user profiles, transaction histories) that is used by the network system 102.

In example embodiments, the publication system 116 publishes content on a network (e.g., Internet) in the form of webpages. As such, the publication system 116 provides a number of publication functions and services to users (e.g., a seller via the client device 106)) that publish content via the network system 102. For example, the publication system 116 can host a marketplace application that provides a number of functions and services to users, such as publishing listing whereby a user (e.g., a seller) may list (or publish information concerning) goods or services (also referred to as "items") for sale, a potential user or buyer can express interest in or indicate a desire to purchase such goods or services, and a transaction pertaining to the goods or services is processed. The publication system 116 also allows users (e.g., buyers) to access the publications and to transact for goods (also referred to as "items") or services. However, it is noted that the publication system 116 may, in alternative embodiments, be associated with a non-marketplace environment such as an informational environment (e.g., search engine) or social networking environment that publishes articles, reviews, or other types of information.

The processing system 118 comprises one or more components (e.g., servers, engines, processors) that manage integration of item authentication with automated refund processing in the network environment 100. The processing system 118 will be discussed in more detail in connection with FIG. 2 below.

While the publication system 116 and the processing system 118 are shown in FIG. 1 to form part of the network system 102, it will be appreciated that, in alternative embodiments, the publication system 116 or the processing system 118 may form part of a separate service that is distinct from the network system 102. Further still, one or more components of the processing system 118 may, alternatively, be located within the publication system 116 or vice-versa. Furthermore, while the client-server-based network environment 100 shown in FIG. 1 employs a client-server architecture, the present inventive subject matter is of course not limited to such an architecture and could equally well find application in a distributed or peer-to-peer architecture system, for example.

In example embodiments, any of the systems, servers, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems, servers, or devices illustrated in FIG. 1 may be combined into a single system, server, or device, and the functions described herein for any single system, server, or device may be subdivided among multiple systems or devices. Additionally, any number of network systems 102, networks 104, client devices 106, and authenticator systems 108 may be embodied within the network environment 100. Furthermore, some components or functions of the network environment 100 may be combined or located elsewhere in the network environment 100.

Figure 2:
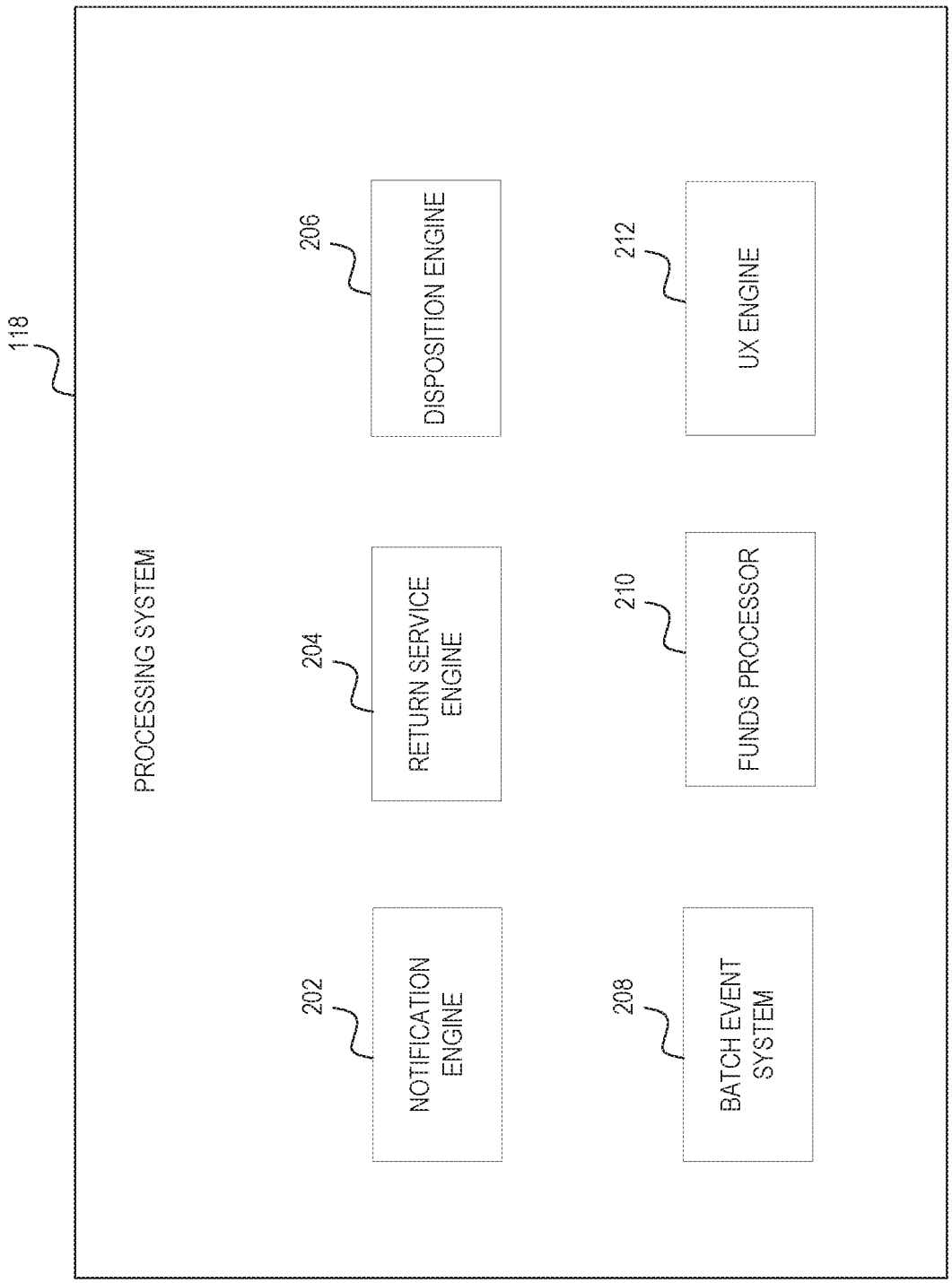
FIG. 2 is a block diagram illustrating components of a processing system, according to some example embodiments.

FIG. 2 is a block diagram illustrating components of the processing system 118, according to some example embodiments. In example embodiments, the processing system 118 comprises one or more servers that include components that manage authentications and return processing in the network environment 100. To enable these operations, the processing system 118 comprises a notification engine 202, a return service engine 204, a disposition engine 206, a batch event system 208, a funds processor 210, and a user experience (UX) engine 212.

The notification engine 202 is configured to manage notifications at the processing system 118. In example embodiments, the notification engine 212 receives, via application protocol interface (API) calls, indications of whether items are authentic or not. Based on the indications, the notification engine 202 can trigger (e.g., via another API call) the return service engine 204 to automatically perform some of its operations. In some embodiments, the notification engine 202 is also configured to generate and transmit various notifications the accounts involved in the authentication and return processing process. The notification can be in the form of an e-mail sent to the client device 106 of an involved party (e.g., a buyer or seller), a text message transmitted to a mobile device (which may be the client device 106) associated with an involved account, or a locked screen message transmitted to the mobile device associated with the account that has the site application installed thereon.

The return service engine 204 is configured to create a return (also referred to as a "return case") and maintain data associated with the return at the processing system 118. In some embodiments, in response to the notification engine 202 receiving the indication of an item is not authentic, the return service engine 204 is automatically triggered to create (e.g., open) the return in a database (e.g., in storage device 122). In other embodiments, the return service engine 204 creates the return in response to the notification engine 202 receiving an indication from the buyer (e.g., via an API call from the client device 106 or via the site application on the client device 106) that they want to initiate a return of an item that they have already received. The return service engine 204 maintains status and information for each return including return details.

In some embodiments, the return service engine 204 accesses transaction history (e.g., stored in the storage device 122) to obtain information used in generating and maintaining the return details. For example, the return details can include identity of the involved parties and their respective accounts, transaction amount, details about the item involved in the transaction, and addresses of the involved parties. Some of the status or data may be provided to other components of the processing system 118 or the client devices 106 as will be discussed in further detail below. Additionally, based on certain detected actions, the return service engine 204 can transmit shipping address information (e.g., via the notification engine 202), based on the retrieved addresses of the involved parties, to the client device 106 or the authenticator system 106 to ship the item.

The disposition engine 206 is configured to manage the return process based on authenticity at the processing system 118. In example embodiments, the deposition engine 206 monitors the batch event system 208 for a triggering event. In one embodiment, the triggering event is detecting an item ship event, which may include a tracking number corresponding to a shipping label associated with the return. Based on the triggering event, the deposition engine 206 accesses return details from the return service engine 204 in order to escalate the case. Escalation by the deposition engine 206 allows an action to be taken on the return such as adjudication, arbitration, or refund processing. Additionally, escalation triggers notifications (e.g., emails) to be sent and statuses updated/saved (e.g., at the return service engine 204). In case where the seller is attempting to sell an unauthentic item, escalating the case by the disposition engine 206 includes triggering the refund process. Alternatively, in cases where the buyer is attempting to return an unauthentic item (e.g., the buyer switches an authentic item with the unauthentic item or one or more unauthentic parts), the disposition engine 206 may escalate the case by closing the return.

The batch event system 208 maintains batch event data at the processing system 118. In example embodiments, the batch event system 208 receives event data in batches such as updates from the return service engine 204. The batch event system 208 then parses each batch to identify individual item information. In some cases, the updates or individual item information include various shipping statuses for items involved in return processes. For example, the updates can indicate that packages containing items have been marked as shipped (e.g., back to the buyer or the seller).

The funds processor 210 is configured to manage the refund process at the processing system 118. In example embodiments, the funds processor 210 is automatically triggered by the deposition engine 206 upon the deposition engine 206 detecting that the item is marked as being shipped back either to the buyer when the buyer is attempting to return an unauthentic item or to the seller when the seller is attempting to sell an unauthentic item. In alternative embodiments, the funds processor 210 may be automatically triggered by the disposition engine 206 to process a refund based on other triggers (e.g., when the item is received by the buyer or seller; when the indication that the item is not authentic is received).

In embodiments where the seller is attempting to sell an unauthentic item, the funds processor 210 processes the refund by deducting funds from the account associated with the seller and returning the funds to the account of the buyer (e.g., wherein the account associated with the client device of the buyer previously provided payment to purchase the item and the account associated with the second client device of the seller provided the item for sale). Alternatively, the funds processor 210 may provide the funds to the account of the buyer from an account associated with the network system 102 and subsequently attempt to recover the funds from the account of the seller.

The user experience (UX) engine 212 is configured to maintain a profile user experience (UX). In particular, the UX engine 212 maintains and updates notifications in the profile UX of each buyer or seller, whereby the profile UX is accessible via a browser session with a website associated with the network system 102. Accordingly, the profile UX can display details of a return including a time when each event of the return occurs at the processing system 118 and a description for each event of the return. For example, the profile UX can display a time when the return is requested, the return (e.g., return case) opened, shipping or tracking information is provided, item shipped, item received, refund processed, and/or the return closed. The profile UX can also provide other information associated with the return and/or the corresponding purchase (e.g., item description, images, contact information, order date, order number). In some embodiments, the user interfaces presented by the profile UX also allow the buyer or seller to provide information during the authentication or refund process.

While the processing system 118 is illustrated as having certain components in FIG. 2, the processing system 118 may also comprise other components (not shown) that are not pertinent to example embodiments. Furthermore, any one or more of the components (e.g., engines, systems, processors) described herein may be implemented using hardware (e.g., a processor of a machine) or a combination of hardware and software. Moreover, any two or more of these components may be combined into a single component, and the functions described herein for a single component may be subdivided among multiple components.

Figure 3:
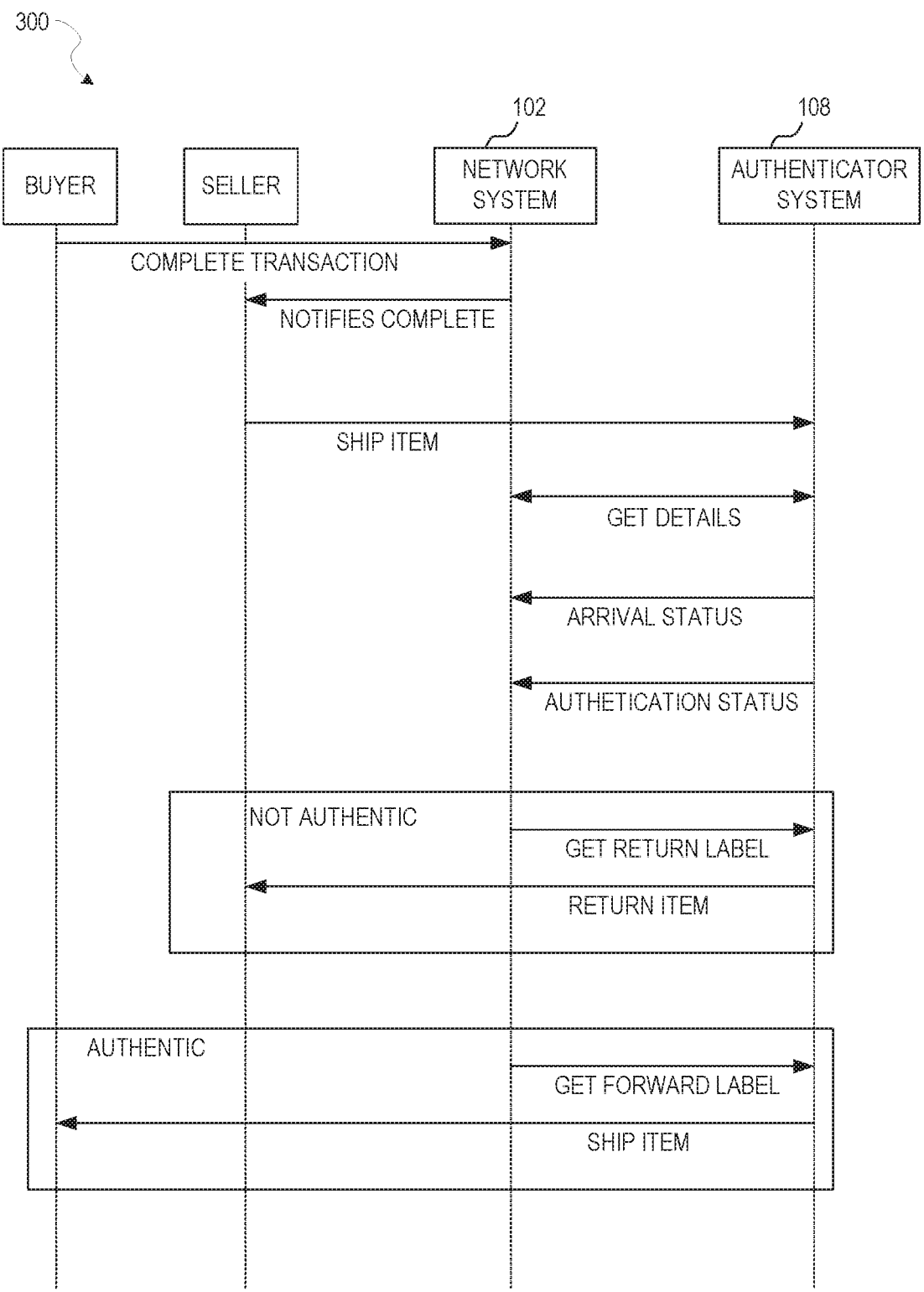
FIG. 3 is an interaction diagram illustrating interactions involving an authenticator-initiated return process, according to some example embodiments.

FIG. 3 is high-level interaction diagram 300 illustrating interactions involving an authenticator-initiated return process that occurs post-transaction, according to some example embodiments. The operations in the interaction diagram 300 occur between a buyer, a seller, components of the network system 102, and the authenticator system 108. Initially, a transaction is completed between the buyer and the seller and the buyer, via their client device 106, sends an indication of the completion of the transaction to the network system 102 (e.g., via an API call). In response, the network system 102 notifies the seller via the client device 106 that the transaction is complete. This may include transmitting shipping label data to the seller client device 106 that provides an address (or code that indicates the address). The seller then ships the package to the authenticator and may provide, via the buyer client device 106 (e.g., via an API call), shipping confirmation to the network system 102 and/or the authenticator system 108.

Based on a notification, received by the authenticator system 108, that the package has been shipped by the seller, the authenticator system 108 accesses a transaction history associated with the corresponding transaction at the network system 102. The authenticator system 108 thus obtains details of the item involved in the transaction such as, for example, one or more of make, model, serial number, description, or manufacturer.

When the item is received by the authenticator, an arrival status is transmitted by the authenticator system 108 to the network system 102 (e.g., via an API call). The authenticator then examines the item to determine its authenticity. An indication of authenticity (also referred to as "authentication status") is then transmitted, via an API call, from the authenticator system 108 to the network system 102.

In embodiments where the item is not authentic, the network system 102 transmits a return label (or data representing the return label such as a code) to the authenticator system 108. The authenticator then returns the unauthentic item to the seller. Alternatively, in embodiments where the item is authentic, the network system 102 transmits a forwarding label (or data representing the forwarding label) to the authenticator system 108. The authenticator then forwards the authentic item to the buyer.

Figure 4:
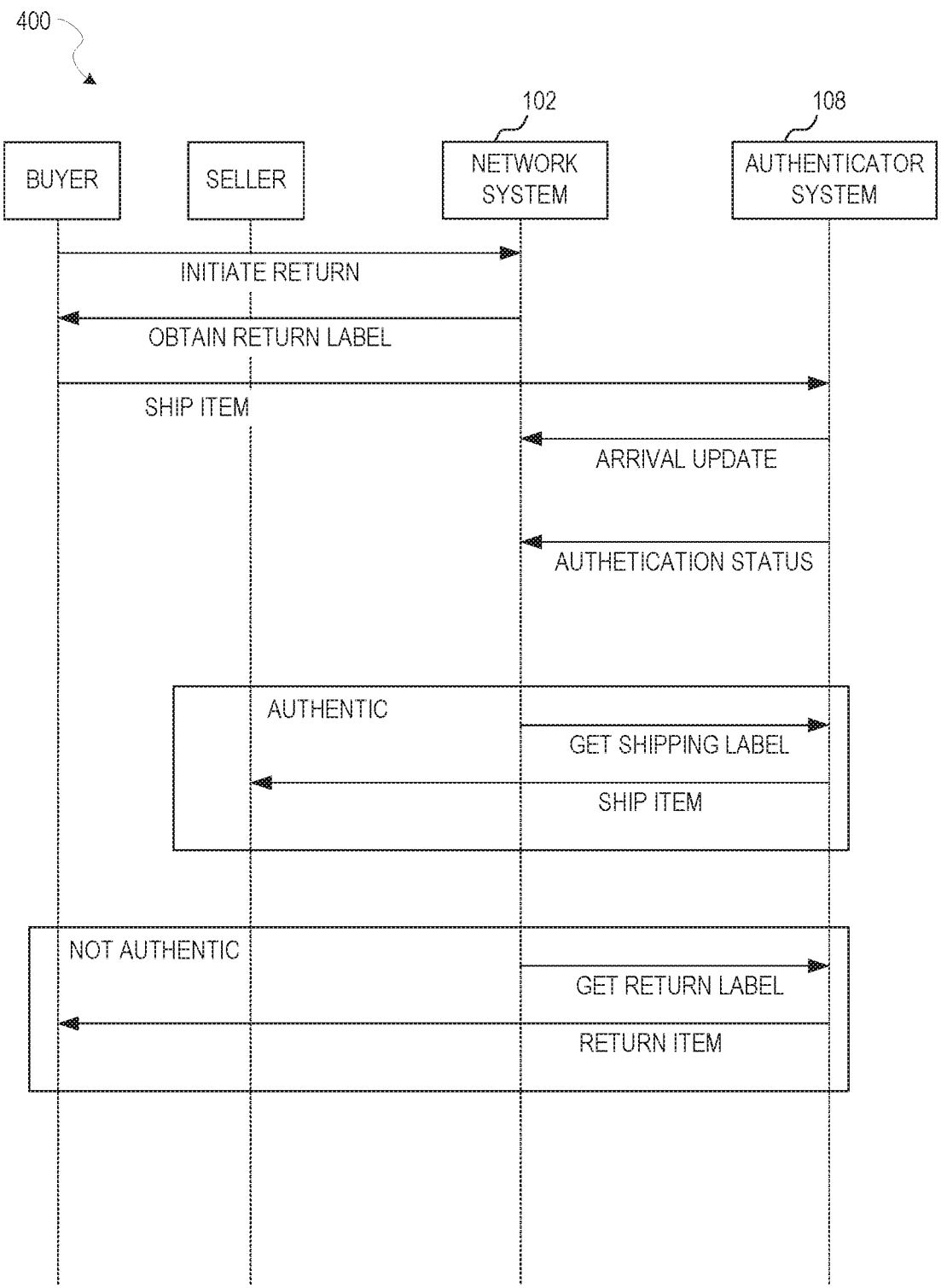
FIG. 4 is an interaction diagram illustrating interactions triggered by a buyer-initiated return process, according to one example.

FIG. 4 is a high-level interaction diagram 400 illustrating interactions triggered by a buyer-initiated return process, according to one example. The operations in the interaction diagram 400 occur between a buyer, a seller, components of the network system 102, and the authenticator system 108. Initially, the buyer transmits, via their client device 106, a request to initiate a return (e.g., via an API call). In response, the network system 102 transmits shipping label data, to the buyer client device 106, that provides an address (or code that indicates the address) for shipping the item to the authenticator. The buyer then ships the item to the authenticator. The buyer can also transmit, via the buyer client device 106 (e.g., via an API call), shipping confirmation to the network system 102 and/or the authenticator system 108.

When the item is received by the authenticator, an arrival update or status is transmitted by the authenticator system 108 to the network system 102 (e.g., via an API call). The authenticator then examines the item to determine its authenticity. An indication of authenticity or authentication status is then transmitted, via an API call, from the authenticator system 108 to the network system 102.

In embodiments where the item is authentic, the network system 102 transmits a shipping label (or data representing the shipping label) to the authenticator system 108. The authenticator then ships the authentic item to the seller. Alternatively, in embodiments where the item is not authentic, the network system 102 transmits a return label (or data representing the return label) to the authenticator system 108. The authenticator then returns the unauthentic item to the buyer.

Figure 5:
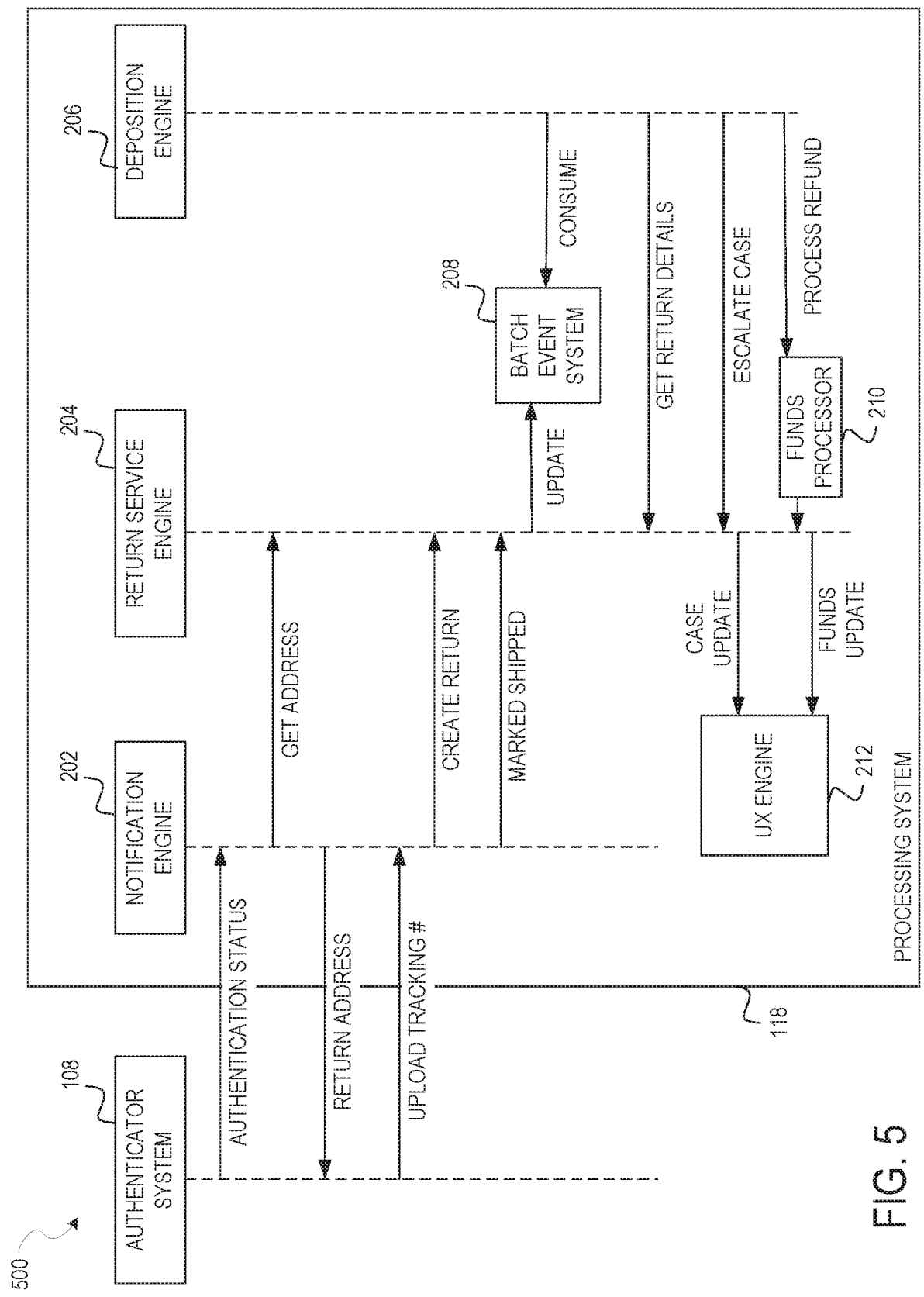
FIG. 5 is an interaction diagram illustrating interactions between an authenticator system and the processing system, according to one example.

FIG. 5 is an interaction diagram 500 illustrating more detailed interactions between the authenticator system 108 and components of the processing system 118, according to example embodiments. The interaction diagram 500 describes an authenticator-initiated return process whereby the authenticator determines that an item received from a seller prior to the buyer obtaining physical possession of the item is not authentic. Accordingly, an authentication status is transmitted, via an API call, from the authenticator system 108 to the notification engine 202 of the processing system 118.

Based on receiving the indication that the item is not authentic, the notification engine 202 accesses (e.g., obtains, retrieves) an address to return the item to the seller from the return service engine 204. In example embodiments, the return service engine 204 accesses transaction history (e.g., stored in the storage device 122) to obtain the address for the seller along with other information which may be used in generating and maintaining the return details. The notification engine 202 then transmits the return address (to return the unauthentic item to the seller) to the authenticator system 108. In response to receiving the return address, the authenticator can ship the unauthentic item back to the seller. Additionally, a tracking number of the shipping label is uploaded (e.g., via a UI or UX) from the authenticator system 108 to the notification engine 202 (e.g., via a second API call). The upload of the tracking number provides a confirmation that the item has shipped. Alternatively, other indicators confirming that the item has shipped can be provided (e.g., providing an indication via a user interface that the item has shipped such as marking or selecting a shipped icon).

In one embodiment, the receipt of the uploaded tracking number or shipping confirmation by the notification engine 202 automatically triggers creating a return at the return service engine 204. For example, the return service engine 204 can create an entry in a database in which status, transaction details, and return details can be maintained. In some embodiments, the return service engine 204 accesses transaction history (e.g., stored in the storage device 122) to obtain information used in maintaining the entry including respective user accounts of the involved parties, a transaction amount, details about the item involved in the transaction, and addresses of the involved parties. While the interaction diagram 500 illustrates the return being created based on receiving shipping confirmation (e.g., receiving the tracking number), alternative embodiments may trigger the return service engine 204 to create the return at the processing system 118 based on other triggers. For example, the return can be created based on receiving the authentication status (e.g., the indication that the item is not authentic).

Based on the receipt of the tracking number or other indication that the item has been shipped back to the seller, the notification engine 202 notifies the return service engine 204 of the same. In response, the return service engine 204 updates the return entry in the database to indicate the shipped status. The return service engine 204 (or notification engine 202) also transmits status updates to the batch event system 208. In example embodiments, the batch event system 208 receives batch event data, parses individual item information, and/or stores the individual item information. The batch event data can include, for example, updates from the return service engine 204.

At a subsequent time (e.g., a predetermined time), the deposition engine 206 consumes the data stored by the batch event system 208. The consumed data may comprise triggering events that will automatically cause the deposition engine 206 to perform operations associated with the return. In one embodiment, the triggering event is the detection of an item ship event (e.g., based on receipt of the tracking number). Based on the triggering event, the deposition engine 206 accesses the return details from (or via) the return service engine 204 in order to escalate the case. In case where the seller is attempting to sell an unauthentic item, escalating the case by the disposition engine 206 includes triggering the refund processor 210 to process the refund.

Once triggered, the funds processor 210 automatically processes the refund by deducting funds from the account associated with the seller and returning the funds to the account of the buyer. Alternatively, the funds processor 210 provides the funds to the account of the buyer from an account associated with the network system 102 and subsequently attempt to recover the funds from the account of the seller. The deposition engine 206 (or funds processor 210) can cause the return to be closed at the return service engine 204 once the funds transfer is completed.

At various points in the return process, the UX engine 212 receives updates which causes an update to the profile UX. In example embodiments, the profile UX is updated substantially simultaneously with receiving any updates. Accordingly, the profile UX can display details of a return including a time when each event of the return occurs at the processing system 118 and a description for each event of the return as soon as the update is received. While not shown, the update can include when the return is created and when the item has been shipped and/or received by the seller. This is in addition to illustrated updates including when the case is escalated (e.g., the refund will be processed) and when the refund process is completed.

The operations and interactions of the interaction diagram 500 can be performed by the various components of the network system 102 without any human intervention. That is, all of the operations can be triggered and automated based simply on receiving information via API calls from the authenticator system 108 and based on transmission of triggering event information (which may also be transmitted via API calls in some cases) between components of the processing system 118.

A similar set of interactions may be used in a buyer-initiated return process whereby the authenticator determines whether an item received from a buyer is authentic. One difference may be that the return is created based on receiving a return request from the buyer, instead of being triggered by a notification from the authenticator system 108 (e.g., receipt of the authentication status or tracking number). For cases where the item is authentic, the return address is the seller, while for cases where the item is not authentic, the return address is the buyer. The remainder of the interactions may be similar in the case where the item is authentic. In cases where the item is not authentic, the deposition engine 206 may escalate the case by closing it without triggering a refund process.

Figure 6:
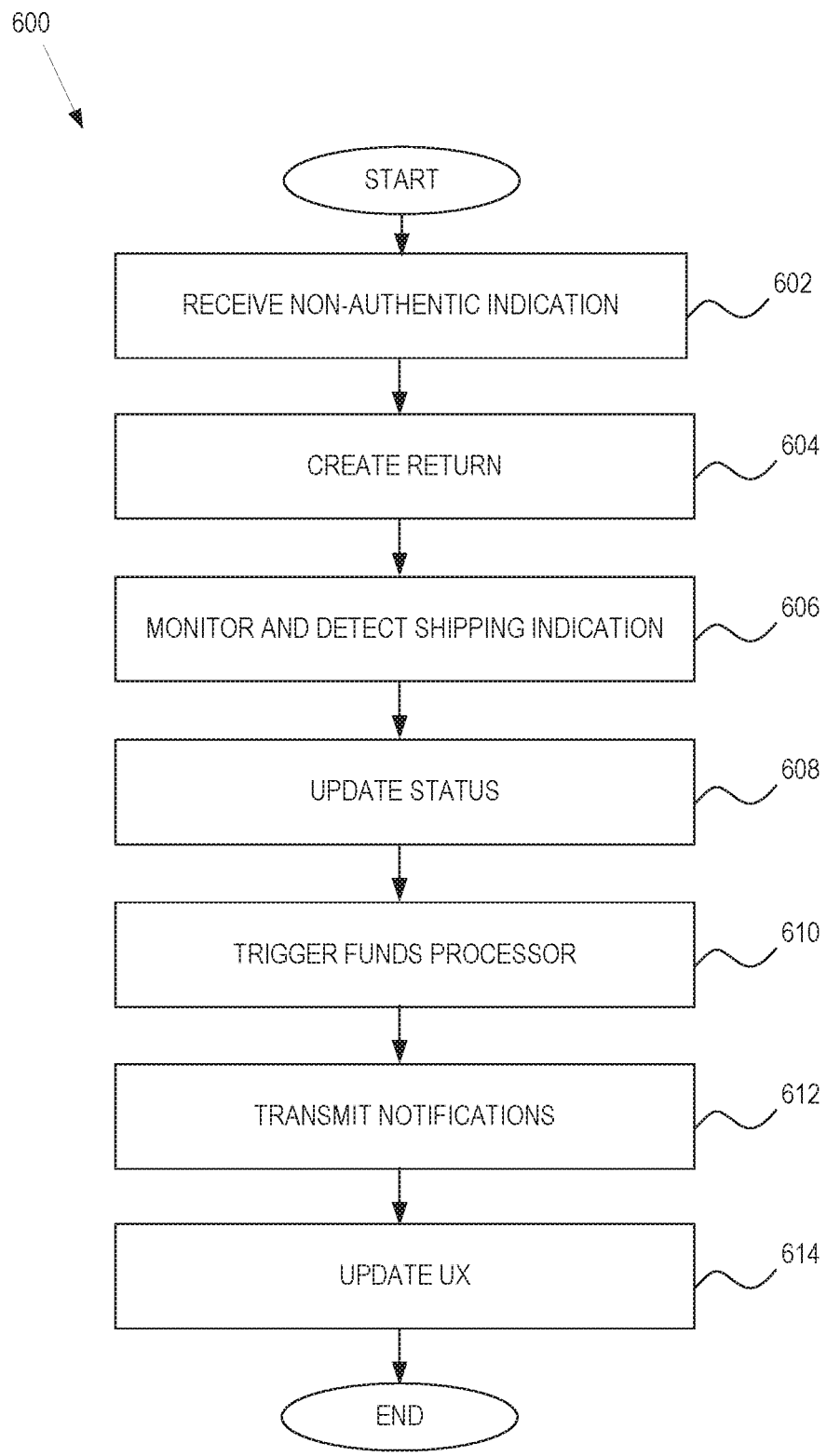
FIG. 6 is a flowchart of a method for managing a post-transaction authentication and return process triggered by an authenticator, according to some example embodiments.

FIG. 6 is a flowchart of a method 600 for managing a post-transaction authentication and return process triggered by the authenticator, according to some example embodiments. Operations in the method 600 may be performed by the processing system 118 using components described above with respect to FIG. 2. Accordingly, the method 600 is described by way of example with reference to the processing system 118. However, it shall be appreciated that at least some of the operations of the method 600 may be deployed on various other hardware configurations or be performed by similar components residing elsewhere in the network environment 100. Therefore, the method 600 is not intended to be limited to the network system 102.

In operation 602, the notification engine 202 receives an indication that the item is not authentic. In example embodiments, the indication is received via an API call from the authenticator system 108. Responsive to receiving the indication, the notification engine 202 may access (e.g., from the return service engine 204) the address of the seller. The address is subsequently transmitted back (e.g., as an API response) to the authenticator system 108.

In operation 604, a return is created by the return service engine 204. Creating the return includes opening a case (or entry) in a database or data storage where corresponding return information may be stored and accessed from. In some embodiments, the notification engine 202 triggers the return service engine 204 to create the return based on receiving the indication that the item is not authentic in operation 602. In other embodiments, the notification 202 can trigger the return service engine 204 to create the return based on receiving a shipping indication (e.g., via a second API call) from the authenticator system 108 that the item is shipped back to the seller. The shipping indication can be, for example, an upload of the tracking number for the package containing the item via a UI or UX associated with the network system 102.

In operation 606, the notification engine 202 monitors for and detects a shipping indication. In some embodiments, the shipping indication comprises an upload (via an API call) of the tracking number for a package containing the item. In other embodiments, the shipping indication comprises a shipping confirmation notification (e.g., based on a selection of an icon displayed on a user interface presented on the authenticator system 108).

In operation 608, the status of the return is updated with the shipping indication. In response to receiving the shipping indication, the return service engine 204 marks the item as shipped for the return created in operation 604. Subsequently, the batch event system 208 is also updated with the shipping status (as a batch notification of items shipped).

In operation 610, the funds processor 210 is automatically triggered to process the refund. In example embodiments, the deposition engine 206 periodically consumes data including the shipping status from the batch event system 206 and detects the item ship event. In alternative embodiments, the deposition engine 206 can monitor, detect, and/or receive an indication of the item ship event directly from the return service engine 204 or another component of the processing system 118. Once the deposition engine 206 detects the item ship event, the deposition engine 206 accesses return details via the return service engine 204, escalates the case, and triggers the funds processor 210 to process the refund. In embodiment where the seller is attempting to sell an unauthentic item, the funds processor 210 processes the refund by deducting funds from the account associated with the seller and returning the funds to the account of the buyer. Alternatively, the funds processor 210 may provide the funds to the account of the buyer from an account associated with the network system 102 and subsequently attempt to recover the funds from the account of the seller.

In operation 612, notifications are transmitted to the buyer and seller informing them of the completed refund. In some embodiments, the notification engine 202 generates and transmits the notifications to the client devices 106 associated with the accounts of the buyer and seller. The notification can be in the form of an e-mail, a text message transmitted to a mobile device associated with the account of the buyer or seller, or a locked screen message transmitted to a mobile device associated with the account of the buyer or seller that has the site application installed thereon. While the method 600 shows transmission of notifications after the refund is triggered and complete, it is noted that other notifications are also sent. For example, notifications can be sent when the indication that the item is not authentic is received and/or when the return is opened at the return service engine 204.

In operation 614, the profile UX is updated. The UX engine 212 maintains and updates notifications in the profile UX of the buyer and/or seller, whereby the profile UX is accessible via a browser session with a website associated with the network system 102. Accordingly, the profile UX can display details of the return including the time when each event of the return occurred at the processing system 118 and the description for each event of the return. For example, the profile UX can display a time when the return is requested, the return (e.g., return case) open, shipping or tracking information is provided, item shipped, item received, refund processed, and/or the return closed. Thus, while the method 600 shows the profile UX being updated after the refund is triggered and completed, it is noted that the profile UX can be update after each operation performed at the processing system 118.

Figure 7:
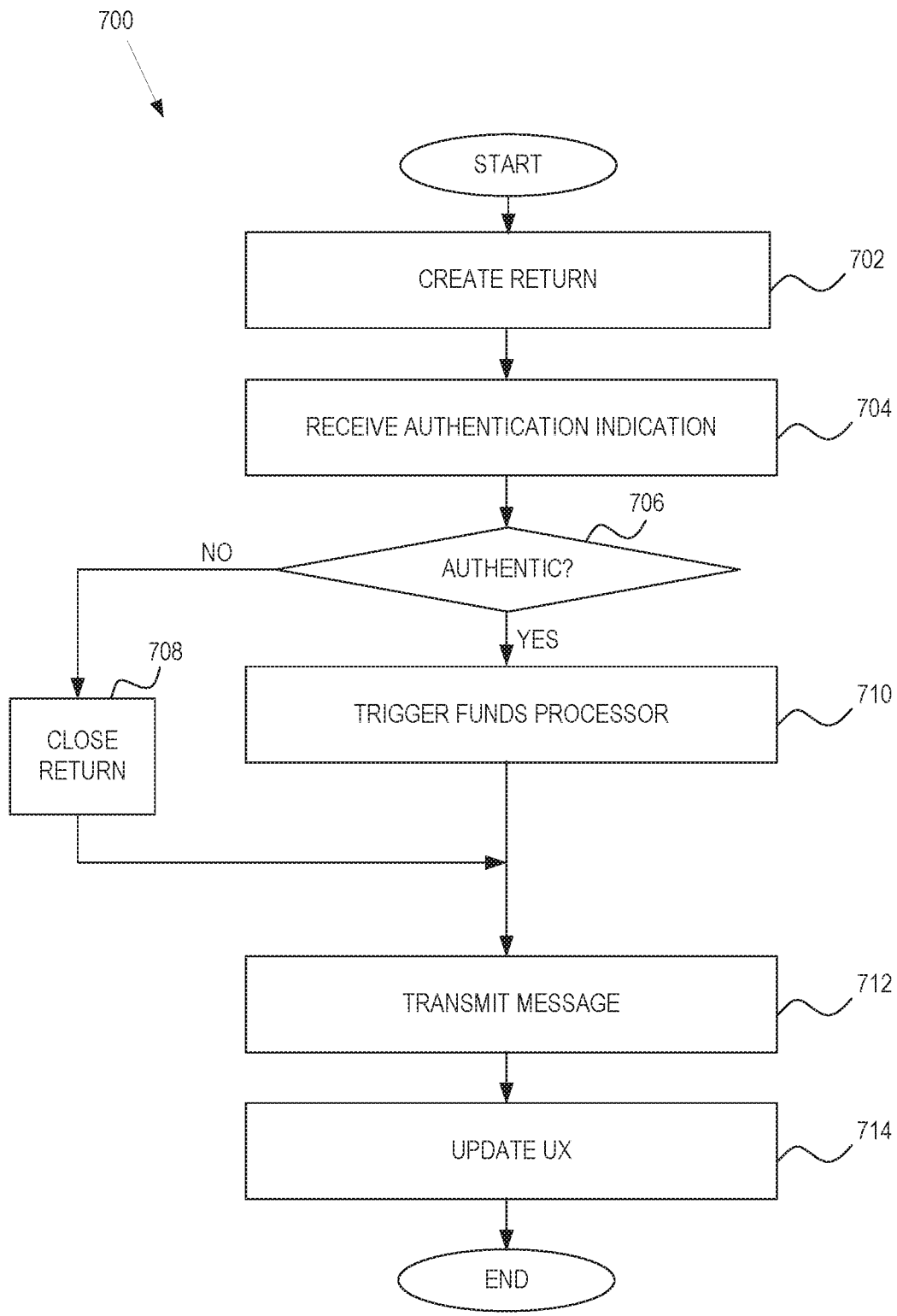
FIG. 7 is a flowchart of a method for managing a post-transaction authentication and return process initiated by a buyer, according to one example.

FIG. 7 is a flowchart of a method 700 for managing a post-transaction authentication and return process initiated by a buyer, according to one example. Operations in the method 700 may be performed by the processing system 118 using components described above with respect to FIG. 2. Accordingly, the method 700 is described by way of example with reference to the processing system 118. However, it shall be appreciated that at least some of the operations of the method 700 may be deployed on various other hardware configurations or be performed by similar components residing elsewhere in the network environment 100. Therefore, the method 700 is not intended to be limited to the processing system 118.

In operation 702, the processing system 118 creates a return (e.g., opens a return case at the network system 102). In example embodiments, the notification engine 202 receives an indication (e.g., via an API call) from the client device 106 of the buyer indicating that the buyer wants to initiate a return. The notification engine 202 triggers the return service engine 204 to create the return based on receiving the indication from the buyer client device 106. The notification engine 202 also transmits a return label or return shipping information to the buyer client device 106. Using the return label or return shipping information, the buyer ships the item to the authenticator.

In operation 704, the processing system 118 receives an indication of whether the item is authentic. In example embodiments, the authenticator examines the item and inputs an assessment of whether the item is authentic into a user interface or UX presented on the authenticator system 108. The assessment is then transmitted (e.g., via an API call) to the processing system 118

In operation 706, a determination in made whether the indication indicates that the item is authentic or not. If the item is indicated to be not authentic, then the return is closed in operation 708. For example, the return service engine 204 updates the status of the return and closes it or the deposition engine 206 triggers the return service engine 204 to update the status of the return and close it at the processing system 118. Closing the return comprises storing an indication that the return is completed in a database maintained by the return service engine 204.

However, if the item is authentic, then the funds processor 210 is triggered in operation 710 to process the refund. For example, the deposition engine 206 or the return service engine 204 can escalate the case and automatically trigger the funds processor 210 to process the refund. Accordingly, the funds processor 210 processes the refund by deducting funds from the account associated with the seller and returning the funds to the account of the buyer. Alternatively, the funds processor 210 may provide the funds to the account of the buyer from an account associated with the network system 102 and subsequently attempt to recover the funds from the account of the seller.

In operation 712, notifications are transmitted to the buyer and seller informing them of the completed refund. In some embodiments, the notification engine 202 generates and transmits the notifications to the client devices 106 associated with the accounts of the buyer and seller. The notification can be in the form of an e-mail, a text message transmitted to a mobile device associated with the account of the buyer or seller, or a locked screen message transmitted to a mobile device associated with the account of the buyer or seller that has the site application installed thereon. While the method 700 shows transmission of notifications after the refund is triggered and complete, it is noted that other notifications are also sent. For example, notifications can be sent when the indication that the item is authentic is received and/or when the return is opened at the return service engine 204.

In operation 714, the profile UX is updated. The UX engine 212 maintains and updates notifications in the profile UX of the buyer and/or seller, whereby the profile UX is accessible via a browser session with a website associated with the network system 102. Accordingly, the profile UX can display details of the return including the time when each event of the return occurred at the processing system 118 and the description for each event of the return. For example, the profile UX can display a time when the return is requested, the return (e.g., case) open, shipping or tracking information is provided, item shipped, item received, refund processed, and/or the return closed. Thus, while the method 700 shows the profile UX being updated after the refund is triggered and completed, it is noted that the profile UX can be update after each operation performed at the processing system 118.

Figure 8:
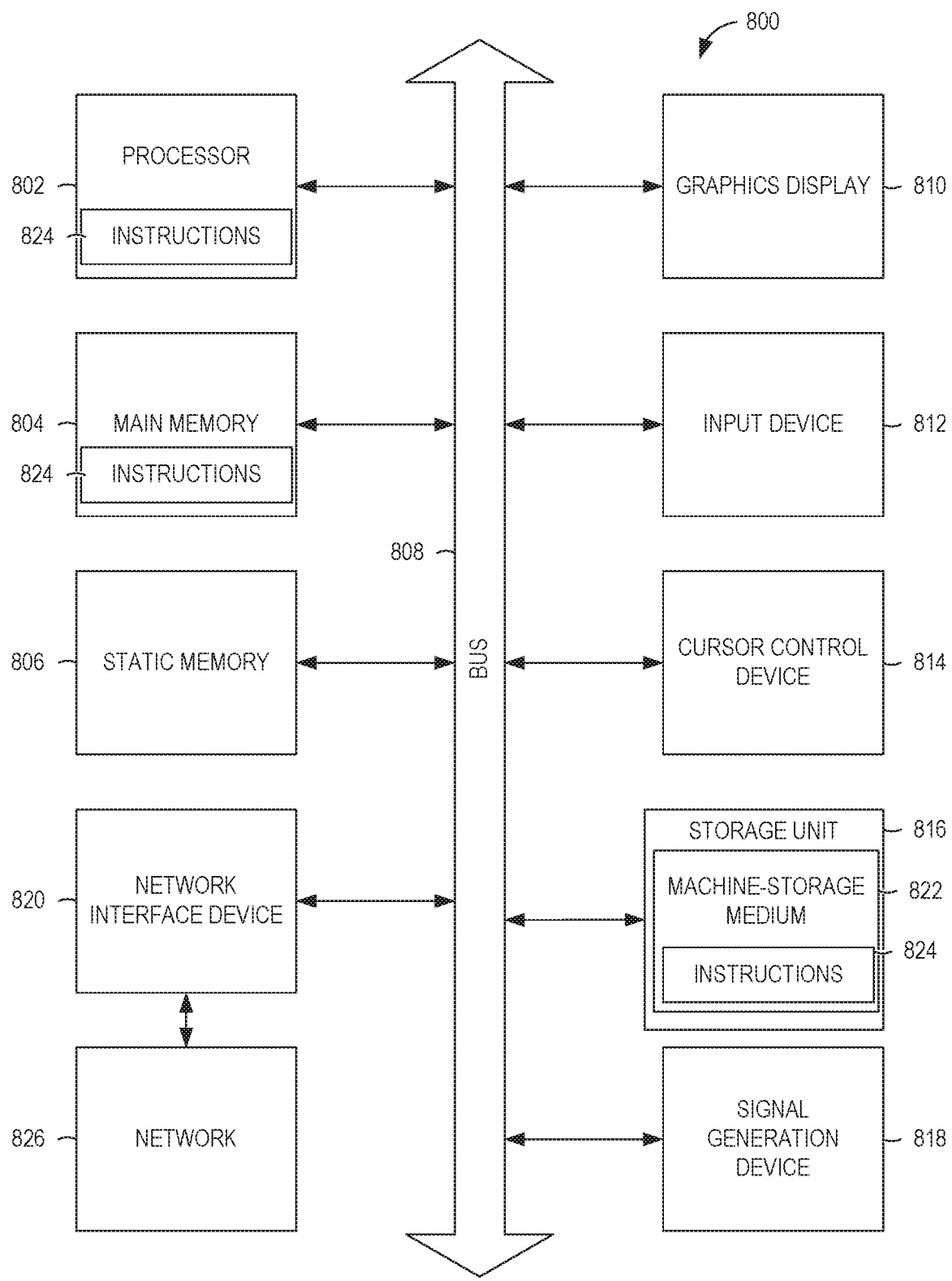
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine storage device, a non-transitory machine-storage medium, a computer storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flowchart of FIG. 6 and FIG. 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-readable media (e.g., tangible and non-transitory machine-readable media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below. In this context, the machine-storage medium or media is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using the transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for automated return processing based on authenticity of an item. The method comprises receiving, by a network system via a first application protocol interface (API) call from an authenticator system, an indication that an item associated with a transaction is not authentic, the transaction occurring on the network system between accounts associated with a first and second client device; based on the receiving of the indication, automatically causing, by one or more hardware processors of the network system, a return to be created at the network system; and automatically triggering the network system to process the return including transferring funds to the account associated with the first client device.

In example 2, the subject matter of example 1 can optionally include wherein the account associated with the first client device previously provided payment to purchase the item and the account associated with the second client device provided the item for sale.

In example 3, the subject matter of any of examples 1-2 can optionally include monitoring, by the network system, for an item ship event that includes a tracking number associated with the return.

In example 4, the subject matter of any of examples 1-3 can optionally include wherein the automatically triggering the network system to process the return is based on detecting the item ship event.

In example 5, the subject matter of any of examples 1-4 can optionally include wherein the automatically triggering the network system to process the return comprises causing a status update at a batch event system of the network system; and detecting, by a disposition engine of the network system, the status update at the batch event system, the disposition engine triggering a fund processor of the network system to automatically process the return including the transferring of the funds based on the detecting.

In example 6, the subject matter of any of examples 1-5 can optionally include, based on the creation of the return at the network system, automatically generating and transmitting a notification to a user having the account associated with the first client device or a notification to a user having the account associated with the second client device that the item is indicated as not authentic.

In example 7, the subject matter of any of examples 1-6 can optionally include wherein the automatically triggering the network system to process the return further comprises generating and providing a notification to a user having the account associated with the first client device or a notification to a user having the account associated with the second client device that the funds are transferred and the return closed.

In example 8, the subject matter of any of examples 1-7 can optionally include wherein the providing the notification comprises updating one or more notifications in a profile user experience (UX) of the user having the account associated with the first client device or the user having the account associated with the second client device, the profile UX being accessible via a browser session with a website associated with the network system.

In example 9, the subject matter of any of examples 1-8 can optionally include wherein the profile UX displays details of the return including time and description of each event associated with the return.

In example 10, the subject matter of any of examples 1-9 can optionally include wherein the providing the messages comprises transmitting at least one locked screen message to a mobile device of the user having the account associated with the first client device or the user having the account associated with the second client device, wherein the mobile device includes a client application associated with the network system.

In example 11, the subject matter of any of examples 1-10 can optionally include wherein the providing the messages comprises transmitting at least one e-mail to the user having the account associated with the first client device or the user having the account associated with the second client device.

In example 12, the subject matter of any of examples 1-11 can optionally include based on the automatically causing the return to be created, accessing, from a data store of the network system, a return address to which a user of the authenticator system returns the item; and transmitting the return address to the authenticator system.

In example 13, the subject matter of any of examples 1-12 can optionally include wherein the network system comprises a return service system and a fund processor, the return service system configured to create, maintain, and close the return and the fund processor configured to process the return including the transferring of the funds between the accounts associated with the first client device and second client device.

In example 14, the subject matter of any of examples 1-13 can optionally include wherein the receiving the indication occurs prior to the item being shipped to a user having the account associated with the first client device by a user having the account associated with the second client device, the authenticator system being an intermediary between the users.

Example 15 is a system for automated return processing based on authenticity of an item. The system includes one or more hardware processors and a memory storing instructions that, when executed by the one or more hardware processors, causes the one or more hardware processors to perform operations comprising receiving, by a network system via a first application protocol interface (API) call from an authenticator system, an indication that an item associated with a transaction is not authentic, the transaction occurring on the network system between accounts associated with a first and second client device; based on the receiving of the indication, automatically causing, by the network system, a return to be created at the network system; and automatically triggering the network system to process the return including transferring funds to the account associated with the first client device.

In example 16, the subject matter of example 15 can optionally include monitoring, by the network system, for an item ship event that includes a tracking number associated with the return, wherein the automatically triggering the network system to process the return is based on detecting the item ship event.

In example 17, the subject matter of any of examples 15-16 can optionally include wherein the automatically triggering the network system to process the return comprises causing a status update at a batch event system of the network system; and detecting, by a disposition engine of the network system, the status update at the batch event system, the disposition engine triggering a funds processor of the network system to automatically process the return including the transferring of the funds based on the detecting.

In example 18, the subject matter of any of examples 15-17 can optionally include wherein the network system comprises a return service system and a fund processor, the return service system configured to create, maintain, and close the return and the fund processor configured to process the return including the transferring of the funds between the accounts associated with the first client device and second client device.

In example 19, the subject matter of any of examples 15-18 can optionally include wherein the receiving the indication occurs prior to the item being shipped to a user having the account associated with the first client device by a user having the account associated with the second client device, the authenticator system being an intermediary between the users.

Example 20 is a machine-storage medium for automated return processing based on authenticity of an item. The machine-storage medium configures one or more processors to perform operations comprising receiving, by a network system via a first application protocol interface (API) call from an authenticator system, an indication that an item associated with a transaction is not authentic, the transaction occurring on the network system between accounts associated with a first and second client device; based on the receiving of the indication, automatically causing, by the network system, a return to be created at the network system; and automatically triggering the network system to process the return including transferring funds to the account associated with the first client device.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and datastores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving, by a notification engine of a network system via a first application protocol interface (API) call from an authenticator system, an indication that an item associated with a transaction is not authentic, the authentication system being an intermediary between accounts associated with a first and second client device by authenticating the item after the transaction has been agreed to between the accounts;
    responsive to the receiving of the indication, automatically triggering, by the notification engine of the network system, a return service engine of the network system to create a return by creating an entry in a database maintaining status, transaction details, and return details;
    receiving, by the notification engine, a tracking number uploaded via a user interface from the authentication system via a second API call, the tracking number indicating a ship event associated with the authenticator system returning the item;
    in response to detection of the ship event, automatically causing, by the notification engine, an update to a shipped status in the entry in the database and a status update to a batch event system that receives batch event data and parses individual item information including the shipped status;
    consuming, by a disposition engine of the network system, data stored by the batch event system including a triggering event including indicating the ship event; and
    in response to detecting the ship event, automatically triggering, by the disposition engine, a funds processor of the network system to process the return including transferring funds to the account associated with the first client device.

2. The method of claim 1, wherein the account associated with the first client device previously provided payment to purchase the item and the account associated with the second client device provided the item for sale.

3. The method of claim 1, wherein the automatically triggering the network system to process the return comprises:
    causing a status update at the batch event system of the network system in response to the detection of the ship event.

4. The method of claim 1, further comprising, based on creation of the return at the network system, automatically generating and transmitting a notification to a user having the account associated with the first client device or a notification to a user having the account associated with the second client device that the item is indicated as not authentic.

5. The method of claim 1, wherein the automatically triggering the network system to process the return further comprises generating and providing a notification to a user having the account associated with the first client device or a notification to a user having the account associated with the second client device that the funds are transferred and the return closed.

6. The method of claim 5, wherein the providing the notification comprises updating one or more notifications in a profile user experience (UX) of the user having the account associated with the first client device or the user having the account associated with the second client device, the profile UX being accessible via a browser session with a website associated with the network system.

7. The method of claim 6, wherein the profile UX displays details of the return including a time and a description of each of a plurality of events associated with the return, the plurality of events including requesting the return, opening the return in a database, shipping an item of the return, receiving the item of the return, processing a refund for the return, and closing the return in the database.

8. The method of claim 5, wherein the providing the notification comprises causing at least one locked screen message to be displayed on a mobile device of the user having the account associated with the first client device or the user having the account associated with the second client device, wherein the mobile device includes a client application associated with the network system.

9. The method of claim 5, wherein the providing the notification comprises causing display of at least one e-mail to the user having the account associated with the first client device or the user having the account associated with the second client device.

10. The method of claim 1, further comprising:
    based on the automatically triggering the return to be created, accessing, from a data store of the network system, a return address to which a user of the authenticator system returns the item; and
    transmitting the return address to the authenticator system.

11. The method of claim 1, wherein the return service engine is configured to create, maintain, and close the return.

12. The method of claim 1, wherein the receiving the indication occurs prior to the item being shipped to a user having the account associated with the first client device by a user having the account associated with the second client device, the authenticator system being the intermediary between the users.

13. A system comprising:
    one or more hardware processors; and
    a memory storing instructions that, when executed by the one or more hardware processors, cause the one or more hardware processors to perform operations comprising:
        receiving, by a notification engine of a network system via a first application protocol interface (API) call from an authenticator system, an indication that an item associated with a transaction is not authentic, the authentication system being an intermediary between accounts associated with a first and second client device by authenticating the item after the transaction has been agreed to between the accounts;

responsive to the receiving of the indication, automatically triggering, by the notification engine of the network system, a return service engine of the network system to create a return by creating an entry in a database maintaining status, transaction details, and return details;

receiving, by the notification engine, a tracking number uploaded via a user interface from the authentication system via a second API call, the tracking number indicating a ship event associated with the authenticator system returning the item;

in response to detection of the ship event automatically causing, by the notification engine, an update to a shipped status in the entry in the database and a status update to a batch event system that receives batch event data and parses individual item information including the shipped status;

consuming, by a disposition engine of the network system, data stored by the batch event system including a triggering event indicating the ship event; and in response to detecting the ship event, automatically triggering, by the disposition engine, a funds processor of the network system to process the return including transferring funds to the account associated with the first client device.

14. The system of claim 13, wherein the automatically triggering the network system to process the return comprises:

causing a status update at the batch event system of the network system in response to the detection of the ship event.

15. The system of claim 13, wherein the return service engine is configured to create, maintain, and close the return.

16. The system of claim 13, wherein the receiving the indication occurs prior to the item being shipped to a user having the account associated with the first client device by a user having the account associated with the second client device, the authenticator system being the intermediary between the users.

17. A machine-storage medium storing instructions that, when executed by one or more hardware processors of a machine, cause the machine to perform operations comprising:

receiving, by a notification engine of a network system via a first application protocol interface (API) call from an authenticator system, an indication that an item associated with a transaction is not authentic, the authentication system being an intermediary between accounts associated with a first and second client device by authenticating the item after the transaction has been agreed to between the accounts;

responsive to the receiving of the indication, automatically triggering, by the notification engine of the network system, a return service engine of the network system to create a return by creating an entry in a database maintaining status, transaction details, and return details;

receiving, by the notification engine, a tracking number uploaded via a user interface from the authentication system via a second API call, the tracking number indicating a ship event associated with the authenticator system returning the item;

in response to detection of the ship event automatically causing, by the notification engine, an update to a shipped status in the entry in the database and a status update to a batch event system that receives batch event data and parses individual item information including the shipped status to be updated;

consuming, by a disposition engine of the network system, data stored by the batch event system including a triggering event indicating the ship event; and in response to detecting the ship event, automatically triggering, by the disposition engine, a funds processor of the network system to process the return including transferring funds to the account associated with the first client device.

* * * * *